US006286612B1

(12) United States Patent
Pascouet

(10) Patent No.: US 6,286,612 B1
(45) Date of Patent: Sep. 11, 2001

(54) SHUTOFF VALVE FOR MARINE ACOUSTIC GENERATOR

(76) Inventor: Adrien P. Pascouet, 8925 Lipan, Houston, TX (US) 77063

( * ) Notice: Subject to any disclaimer, the term of this patent is extended or adjusted under 35 U.S.C. 154(b) by 0 days.

(21) Appl. No.: 09/410,709

(22) Filed: Oct. 1, 1999

(51) Int. Cl.⁷ ...................................................... E21B 47/00
(52) U.S. Cl. .............................. 175/1; 181/115; 181/111; 181/120; 367/144; 367/146
(58) Field of Search .................. 175/1, 27, 50; 181/107, 111, 113, 115, 119, 120, 402; 367/144, 146

(56) References Cited

U.S. PATENT DOCUMENTS

| | | |
|---|---|---|
| 3,612,210 | * 10/1971 | Loper . |
| 3,679,021 | * 7/1972 | Goldberg . |
| 4,210,222 | * 7/1980 | Chelminski et al. . |
| 4,240,518 | * 12/1980 | Chelminski . |
| 4,286,687 | * 9/1981 | Fiske . |
| 4,798,261 | * 1/1989 | Chelminski . |
| 5,018,115 | * 5/1991 | Pascouet . |
| 5,128,907 | * 7/1992 | Pascouet . |
| 5,144,596 | * 9/1992 | Pascouet . |

* cited by examiner

Primary Examiner—Roger Schoeppel
(74) Attorney, Agent, or Firm—Sankey & Luck, L.L.P.

(57) ABSTRACT

A valving system is disclosed which generally comprises a body including an inlet and an outlet where the inlet is disposed in fluid communication with a fluid flow passage and the outlet is disposed in fluid communication with a pressurized fluid member, the body further defining an internal bore in which is slidably disposed a piston moveable between a first and a second position such that fluid communication between the fluid flow passage and the fluid flow member is established when the piston is disposed in the first position but not in the second position, an apparatus and to move the piston from the first position to the second position so as to interrupt fluid flow from the fluid flow passage to the fluid member.

12 Claims, 6 Drawing Sheets

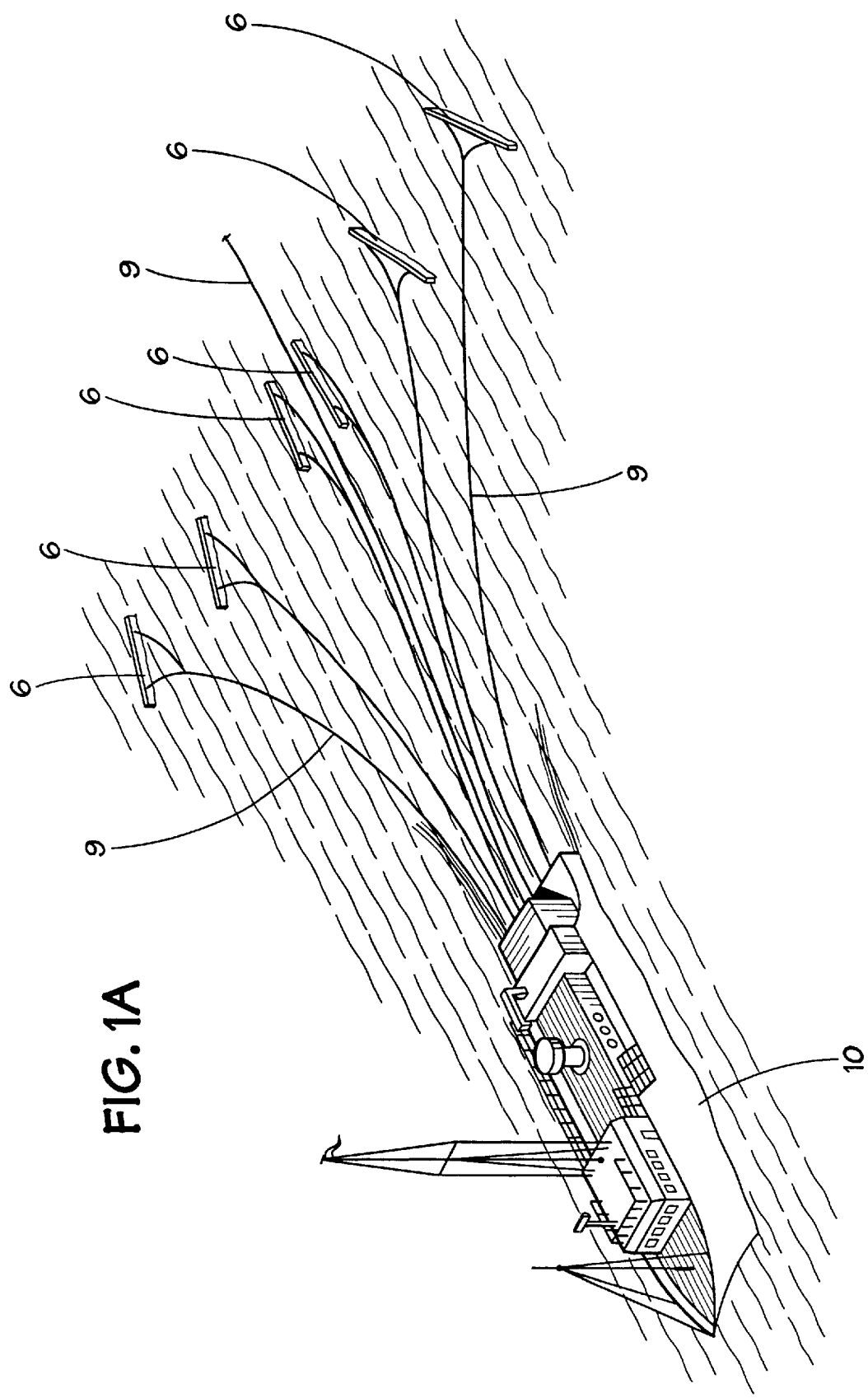

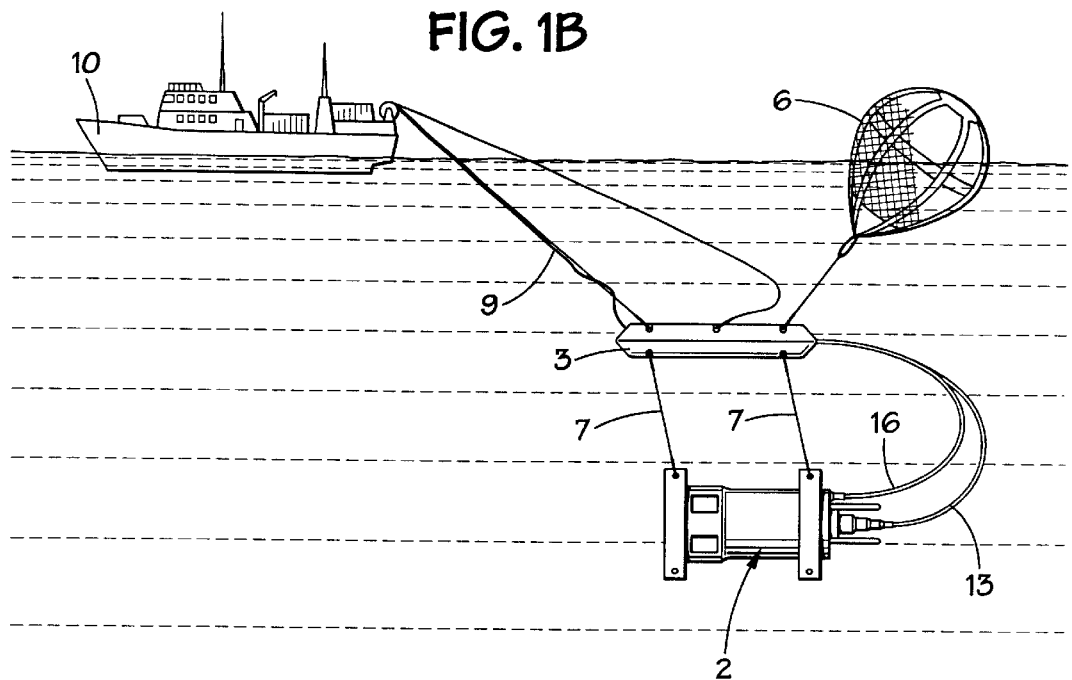
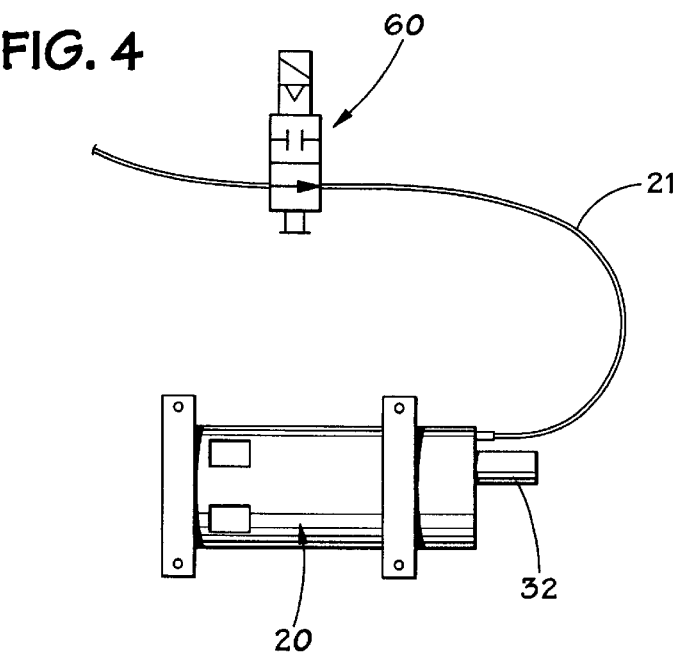

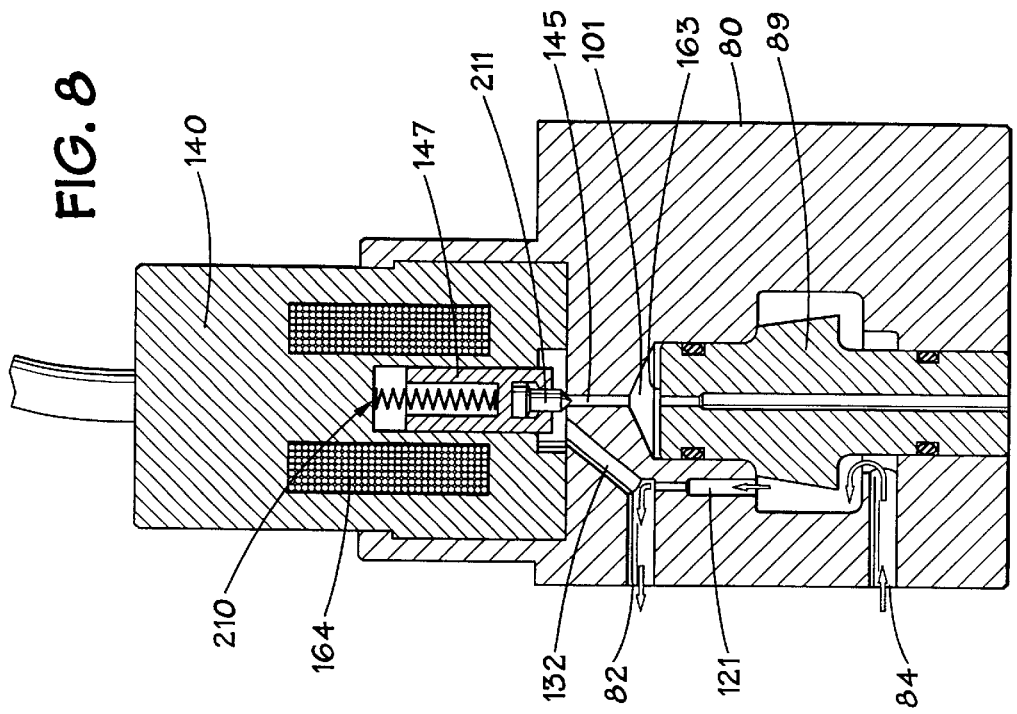
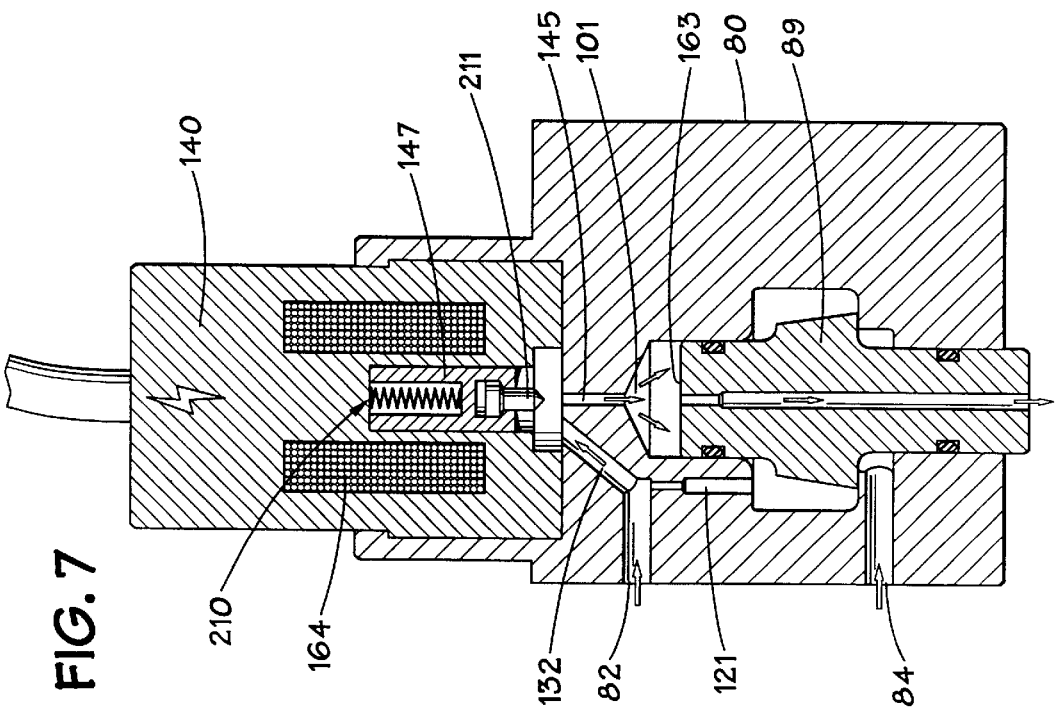

SHUTOFF VALVE FOR MARINE ACOUSTIC GENERATOR

BACKGROUND OF THE INVENTION

1. Field of the Invention

The present invention generally relates to marine acoustic generators and methods for their operation and use. More specifically, the present invention relates to a method and apparatus to selectively cut off fluid flow to any one of an array of marine acoustic generators.

2. Description of the Prior Art

Seismic exploration of subsea formations has involved the use of a variety of differing tools and techniques. One of the most successful tools for a marine seismic exploration is the marine acoustic generator which are commonly referred to as "airguns."

In a general embodiment, the airgun comprises a body in which a shuttle reciprocates between an open and a closed position so as to define an internal cavity. Air is supplied to and pressurized within the cavity until a selected pressure is achieved. The shuttle is then released to exhaust this pressurized air into the surrounding water to create a primary pressure pulse and a series of secondary pulses. It is these pulses which are useful in seismic evaluation.

Disadvantages associated with contemporary marine acoustic generators arise when one in an array of such generators demonstrates a leakage of fluid. Such leakage distorts the signal produced by the operation of the leaking generator and other generators in the array. Accordingly, prior procedure has required that the entire array be shut down and then retrieved on the streaming vessel. It is then necessary to locate the malfunctioning device, replace or repair the generator, restream the array and then repeat the prior seismic track. For obvious reasons, such retrieval of efforts are very costly terms of lost hours and equipment charges.

Disadvantages associated with prior marine acoustic generators also included the danger associated with their disassembly and repair. In this connection, it is not always obvious that a given device still contains a quantity of pressurized fluid (water or air). As a result, attempts to disassemble the device has often resulted in injury and death as a result of accidental explosions of these devices.

SUMMARY OF THE INVENTION

The present invention addresses the above and other disadvantages of prior marine acoustic systems by providing a method and apparatus to selectively shut off pressurized fluid flow to one or more generators.

In a general embodiment, the present invention comprises a valving system which is adapted to be used with existing marine acoustic generators to provide a mechanism to selectively disable one or more generators comprising an array of such generators. The instant system also enables visual detection of the disabled generators and further provides means to vent such generators to prevent accidental explosion during inspection and/or disassembly.

In a preferred embodiment, the present invention comprises a housing defining an inlet, an outlet and an internal cavity where a shuttle is reciprocally disposed in said cavity between a first and a second position. The housing further defines a series of fluid flow portals disposed about the shuttle in said housing where some of said portals may be closed, and thus air redirected, upon the actuation of a second piston which is also reciprocally disposed in said housing. In one preferred embodiment, the second piston defines a solenoid.

The inlet is coupled via a pressurized fluid line to a supply of pressurized air. The outlet is coupled via a second pressurized line to the marine acoustic generator.

During operation of the marine acoustic generator, air passes unobstructed through the subject valve to be released by the acoustic generator in the generation of acoustic pulses. Upon receipt of a discrete electrical signal, however, the solenoid in the valve moves to a "closed" orientation, thereby selectively disabling the generator by preventing the continuing flow of air to said generator.

The present invention presents a number of advantages over the prior art. One such advantage is the ability to selectively disable a malfunctioning acoustic generator without the need for the wholesale shutdown and retrieval of the seismic array. In such a fashion, significant savings in terms of cost and time may be observed.

Another advantage of the invention is the ability to safely vent a pressurized generator prior to inspection and disassembling. In such a fashion, serious injuries may be avoided.

BRIEF DESCRIPTION OF THE DRAWINGS

FIGS. 1A and 1B illustrate a diagrammatic view of a towed acoustic array.

FIG. 4 illustrates a pneumatic, diagrammatic view of the valve embodiment illustrated in FIG. 2.

FIG. 7 illustrates a detail, cut-away view of the invention as it appears when the seismic generator is isolated from a source of pressurized fluid.

FIG. 8 illustrates a detail, cut-away view of the invention as it appears when the system is being vented.

DETAILED DESCRIPTION OF THE PREFERRED EMBODIMENTS

Figure 2:
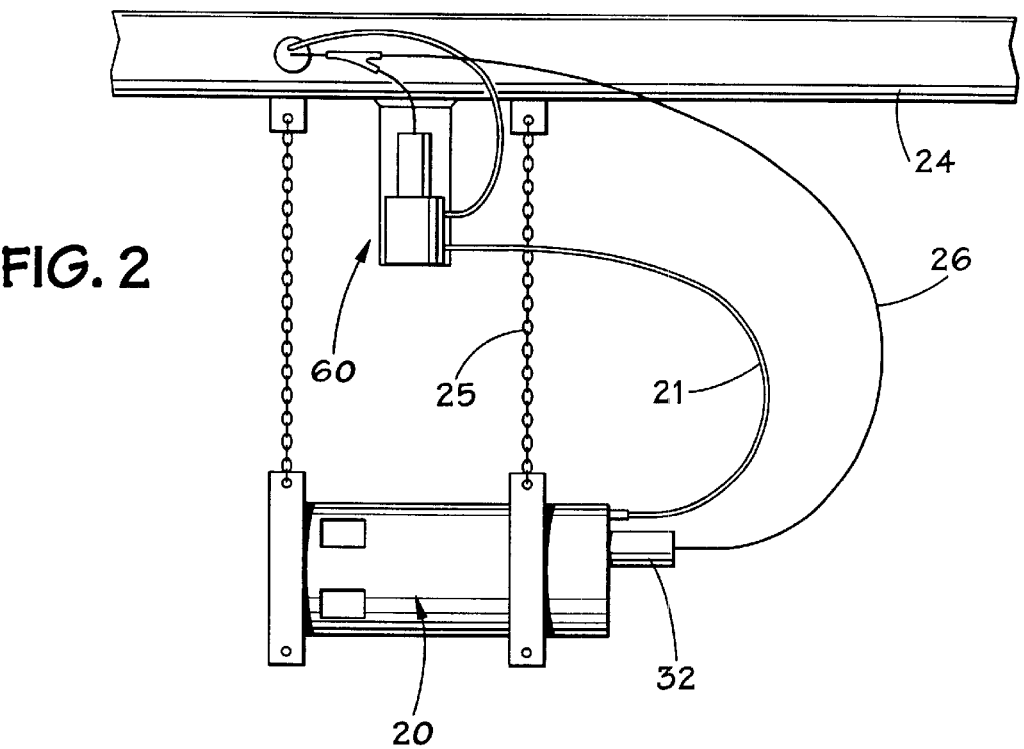
FIG. 2 illustrates a diagrammatic view of one preferred embodiment of the invention as it may be used in a towed array.

The valving system of the present invention has specific application to seismic arrays such as the array illustrated in FIGS. 1A–1B. By reference to these figures, one or more acoustic generators 2 are suspended via a chain 7 or other support beneath a towing bar 3 which is in turn suspended beneath a float or a buoy 6 secured behind a towing platform, e.g. a ship 10, via a tether 9 at a selected distance and orientation to achieve a desired seismic profile. Tether 9 includes a structural member, e.g. a steel cable, and also includes an electrical 13 and pneumatic 16 lines for pressurizing and actuating generators 2 in a manner familiar to those skilled in the art.

In a conventional deployment, each generator 2 is provided with an individual fluid flow member 11 which in turn could be monitored on the towing platform 10. Hence, it is conventionally possible to determine if and when a given generator begins to malfunction and the extent of the malfunction. While such determination has heretofore been possible, it has not been possible to selectively disable the malfunctioning generator 2 so as to avoid the necessity of interrupting the collection of data from the remaining, fully functioning generators 2.

One embodiment of the present invention may be seen by reference to FIGS. 2–5 in which is illustrated a marine acoustic generator 20 which is secured to a frame 24 via a chain 25 or other support means. As illustrated, generator 20 is coupled to an air pressure line or jumper 21 and electrical lines 23 and 26 in a conventional fashion.

Instead of the arrangement of prior art seismic arrays as illustrated in FIGS. 1A–1B, a shut-off valve 60 of the invention is interposed between the pressurized air source (not shown) and a generator 20 in a manner described in greater detail below. By reference to FIGS. 2–4, valve 60 is also electrically connected between the towing platform (not shown) and generator 20. As illustrated in FIG. 2, in one embodiment valve 60 may be secured to a floatable member 24.

Figure 5:
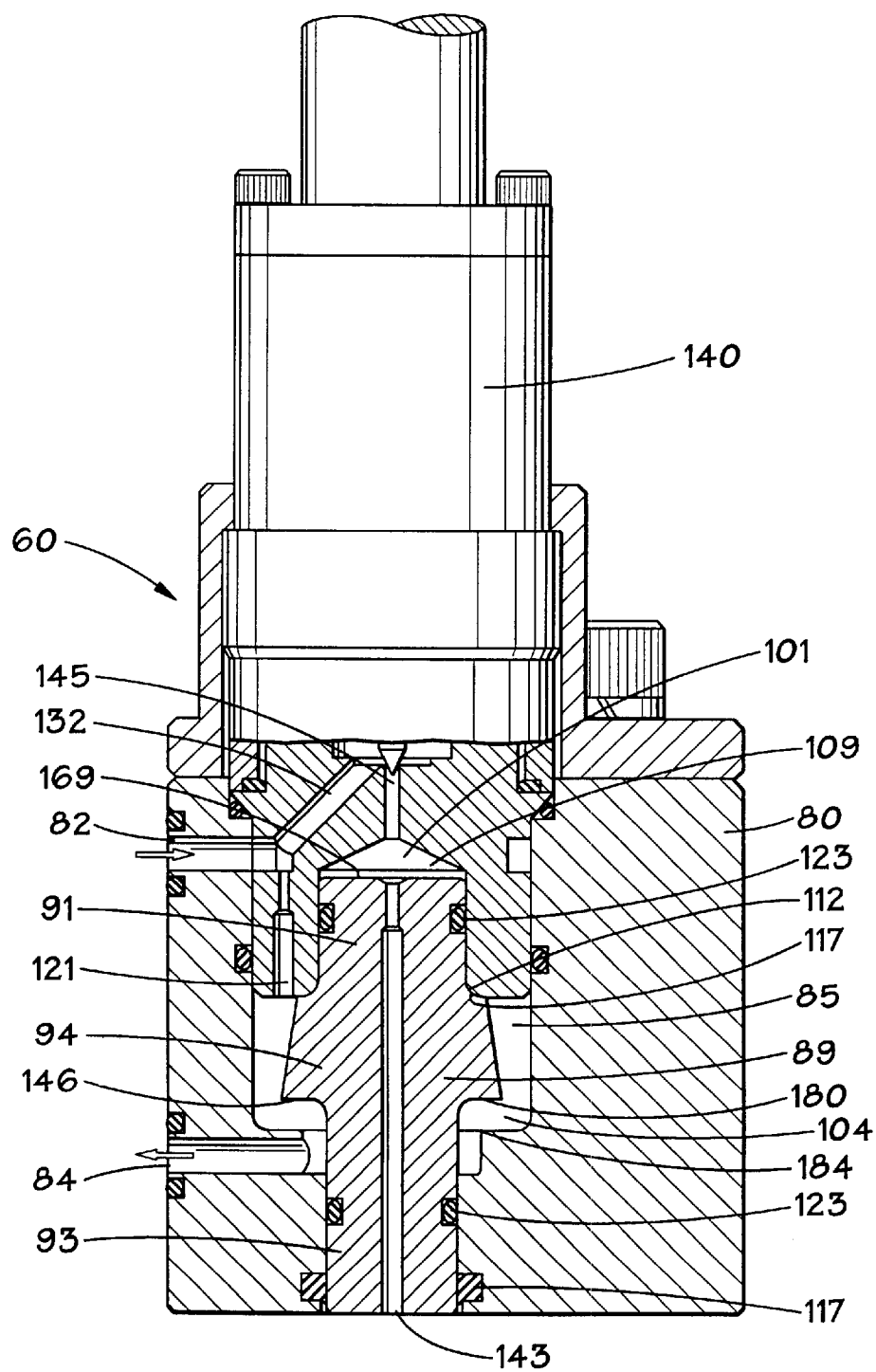
FIG. 5 illustrates a detail, cut-away view of the valve embodiment-illustration in FIG. 2.

A detailed view of a preferred embodiment the shuttle valve of the invention may be seen by reference to FIG. 5, in which is illustrated a housing 80 which defines an inlet 82, an outlet 84 and an internal cavity or bore 85. A piston or shuttle 89 is reciprocally disposed in said cavity 85 between a first or "closed" orientation and a second or "open" orientation, the "closed" or "open" nomenclature referring to whether pressurized air passes through said valve 60 to the generator 20.

In the embodiment illustrated in FIG. 5, piston 89 defines an elongate body where the mid portion 94 of said body defines a greater diameter than the lower portion 93 or the upper portion 91. In a complimentary fashion, cavity 85 defines upper and lower sub-bores 101 and 102, respectively, where the mid portion 104 of cavity 85 defines a sufficiently large diameter to accommodate mid portion 94 so as to allow it a limited range of reciprocation, as will be discussed further herein.

Figure 6:
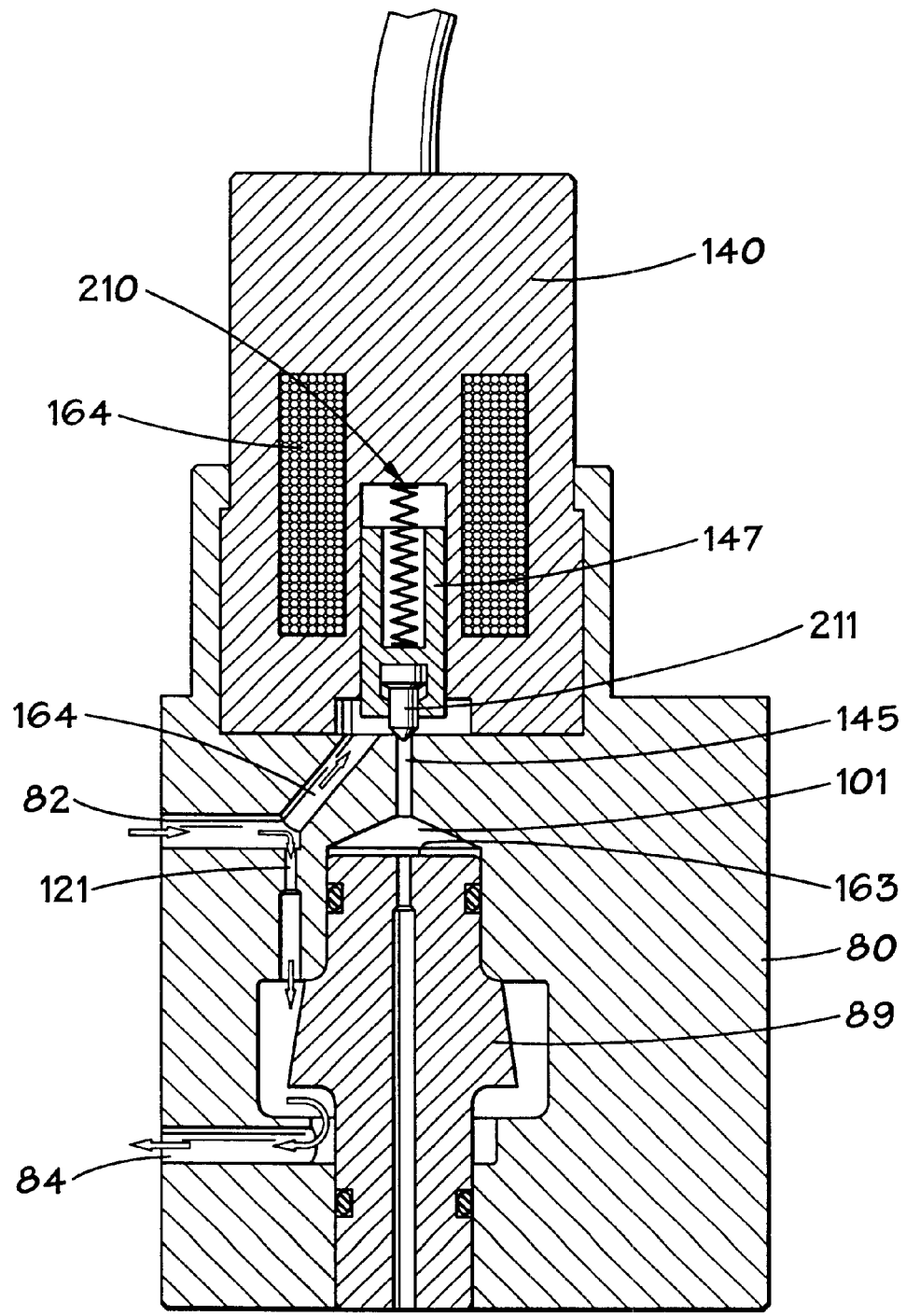
FIG. 6 illustrates a detail, cut-away view of the invention as it appears when the seismic generator is being pressurized.

As illustrated in FIGS. 5 and 6, upper portion 91 of shuttle 89 defines an arcuate shoulder 112 where such shoulder is adapted to seat against a retaining flange 117 when said valve is disposed in an "open" position. Conversely, mid portion 94 of piston 89 defines a flange 180 which is adapted to seat against shoulder 184 when the valve is disposed in a "closed" position (See FIG. 7). Upper 91 and lower 93 portions of shuttle 89 are adapted to fit in close tolerance to bores 101 and 102 so as to prevent the leakage of pressurized air therethrough. Leakage is further prevented through the use of sealing members, e.g. O-rings 123, as illustrated.

Housing 80 defines a first connecting port 121 which allows fluid communication between inlet 82 and outlet 84 when shuttle 91 is disposed in an "Open" position, as illustrated in FIGS. 5 and 6. In such a fashion, pressurized air supplied to valve 60 when in an "open" position passes from inlet 82 to outlet 84 and to generator 20. Such pressurized fluid flow acts on the under surface 146 of mid portion 94 so as to maintain piston 89 in a first or "open" position.

Housing 80 also defines a second connecting port 132 which is disposed in fluid communication with solenoid 140 and a third portal 145. Third portal 145 is disposed in fluid communication with a sub-chamber 109 and thus the top surface 163 of the upper portion 91 of piston 89. Thus, when fluid flow to third portal 145 is uninterrupted, pressurized air from inlet 82 acts against surface 163 to move piston 89 into a second or "closed" orientation (See FIG. 7).

During the ordinary operation of generators 20, air flow to portal 145 is interrupted by solenoid 140 which itself reciprocates between an "open" and "closed" orientation depending on the receipt of electrical impulses through lines 23 and 26. (See FIGS. 2, 3, 6 and 7). The default or initiating position for solenoid 140 is in a second or "closed" orientation. (See FIG. 6). In this position, fluid flow to portal 145 is interrupted and fluid flow to generator 20 is uninterrupted.

In the preferred embodiment illustrated in FIG. 5, the posture of valve 60 may be visually determined by the position of the lower portion 93 of piston 89. If piston 89 is positioned in an "open" or starting position, the lower portion 93 of piston 89 does not extend from housing 80, as illustrated in FIGS. 5–6 and 8. However, when piston 89 is positioned in a "closed" position, lower portion 93 extends from housing 80, as illustrated in FIG. 7, thereby providing a ready visual reference to those generators 20 which have been disabled.

In the embodiment illustrated in FIGS. 6–8, solenoid 140 includes a plunger 147 and a poppet 211 which is biased in a down or closed position by a spring 210. The biasing effect of spring 210 may be overcome when coil 164 is energized.

Figure 3:
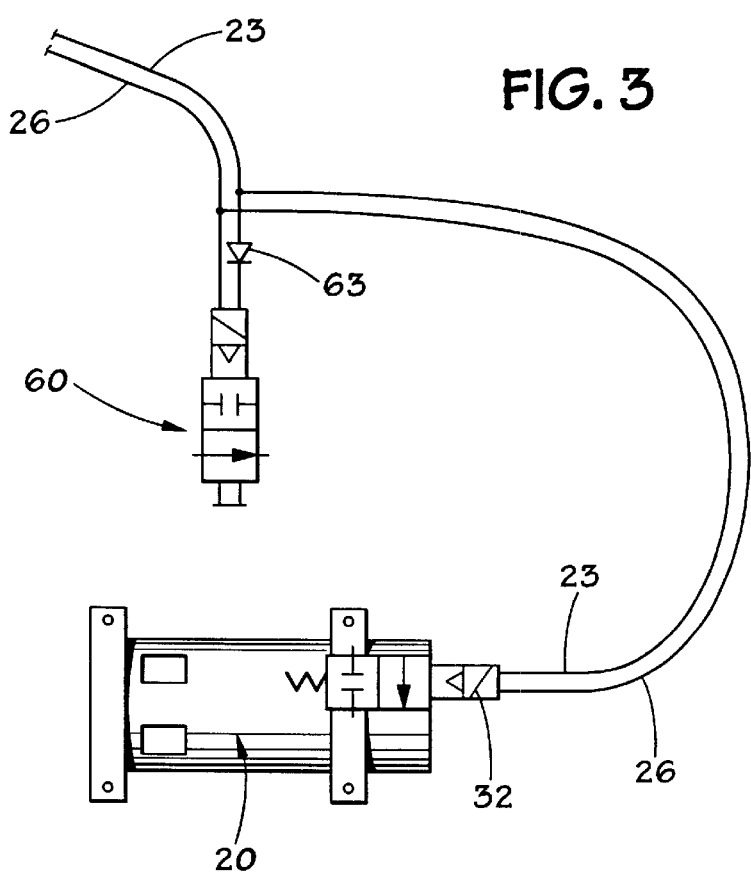
FIG. 3 illustrates an electrical, diagrammatic view of the valve embodiment illustrated in FIG. 2.

Solenoid 140 is electrically coupled to electrical lines 23 and 24 which in turn are coupled to generators 20. Generators 20 are actuated by electrical pulses 4 which are transmitted along said lines 23 and 24 in a conventional fashion as will be recognized by those skilled in the art. A diode 63 is electrically integrated between solenoid 140 and lines 23 and 24 to prevent solenoid 140 from also being actuated upon the transmission of each of the $i_1$ pulses, as shown in FIG. 3. When, however, it is ascertained that a given generator 20 is malfunctioning, a second pulse $i_2$ of a different polarity is transmitted through lines 23 and 24, which pulse also actuates solenoid 140. No extra firing time is required. This is significant in operation since there is a physical limitation due to drag on the number of electrical lines which may be deployed on the towing vessel. For example, a typical string of acoustic generators comprises 6–12 units which would conventionally require 6–12 extra electrical lines.

The operation of valve 60 may be described as follows by reference to FIGS. 6–8. Pressurized air flows through inlet 82 into cavity 85, moving pistons 89 to an "open" position thereupon allowing air flow through outlet 84 to generators 20. (See FIG. 6).

Shuttle 89 is initially positioned in an "open" orientation by and is maintained in an "open" orientation when pressurized air passing through inlet 82 and portal 121 acts on the surface area of the underside shoulder 146 of the shuttle 94. Generators 20 are now operated in a manner consistent with conventional practice. When valve 60 is unpressurized and lower portion 93 of piston 89 extends from housing 80, it is possible to manually replace piston 89 to an "open" position. In this orientation, the lower part 93 of piston 89 does not extend from housing 80. However, when valve 60 is pressurized (even with low pressure) it is impossible to manually move piston 89 to an "open" position. As a consequence, it is possible to manually test valve 60 for any pressurized air inadvertently remaining in housing 80 or in any connecting lines.

When a given generator 20 is identified as malfunctioning, valve 60 is actuated to disable said generator 20. When solenoid 140 is actuated, coil 164 is energized thereby causing plunger 147 to move upward against the biasing force of spring 210. Poppet 211 likewise moves upwardly, thereby removing the obstruction to portal 145. Pressurized air then flows through ports 132 and 145 and acts on the top surface area 163 of shuttle 94. Since the surface area of top 163 is greater than the surface area of shoulder 146, shuttle then moves to a "closed" orientation, thereby preventing further flow of pressurized air to generator 20.

The pressure on top surface 163 of shuttle 89 is slowly vented out through orifice 143 (see FIG. 5), but shuttle 89 remains and is maintained in a "closed" position by the pressure applied when air line 21 is depressurized and if, for any reason, air pressure remains in generator 20, shuttle 89 will be moved to an "open" position. The movement of shuttle 89 in this fashion occurs when the pressure acting on the mid portion of piston 89 becomes less than about 0.7 times the pressure acting on shoulder 146 of piston 89. The movement of shuttle 89 automatically allows air pressure that could be trapped in generator 20 to be vented out through outlet 84 into cavity 85 and then into main line 21 through inlet 82 (See FIG. 8). This pressure relief system provides an important safety feature for proper handling of generator 20, on the mid portion 94 of piston 89. As a consequence, no permanent current is needed to maintain valve 60 is a "closed" orientation. Generator 20 is now effectively disabled.

Any pressurized air in generator 20 passes back through inlet 84 and moves piston 89 off of seat 184 to vent through inlet 82. In such a fashion, each disabled generator 20 is also automatically depressurized for purposes of inspection and disassembly.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. A shutoff valve for use with a marine acoustic generator airgun, which airgun has a reciprocating shuttle that serves to hold a charge of pressurized air and then release the charge of pressurized air into the surrounding water to create a pressure pulse and which utilizes a source of pressurized air transmitted through a fluid flow conduit, said shutoff comprising:

a housing defining a fluid inlet, a fluid outlet and a piston slidably disposed within a chamber between a first position and a second position, where the fluid inlet is coupled to the pressurized fluid conduit, the fluid outlet is coupled to the airgun and the piston defines an upper and a lower portion;

said fluid inlet disposed in fluid communication with the lower portion of said piston such that the pressurized fluid directed through said fluid inlet serves to maintain said piston in said first position, where when said piston is disposed in said first position said inlet and said outlet are disposed in fluid communication with each other so as to supply pressurized air to the airgun; and said housing further defining a fluid flow passage disposed in fluid communication with said chamber about the upper portion of said piston such that fluid directed through said passage serves to move said piston from said first position to said second position so as to interrupt fluid communication between said inlet and said outlet.

2. The valving system of claim 1 where said piston is returned to said first position when pressure acting on the upper portion of said piston is less than about 0.7 times the pressure acting on the lower portion of the piston.

3. The shutoff valve of claim 1 further comprising a solenoid-actuated poppet disposed along said fluid flow passage and biased to a position that normally prevents fluid flow through the passage.

4. A shutoff valve for selectively interrupting the flow of pressurized fluid to a marine acoustic generator airgun, which airgun has a reciprocating shuttle that serves to hold a charge of pressurized fluid and then release the charge of pressurized fluid into the surrounding water to create a pressure pulse, and where said fluid is transmitted through a fluid flow passage, comprising:

a body including an inlet and an outlet where said inlet is disposed in fluid communication with said fluid flow passage and said outlet is disposed in fluid communication with said airgun;

said body further defining an internal bore in which is slidably disposed a piston moveable between a first and a second position such that fluid communication between said fluid flow passage and said airgun is established when said piston is disposed in said first position but not in said second position; and means for moving said piston from said first position to said second position so as to interrupt fluid flow from said fluid flow passage to said airgun.

5. The valve of claim 4 where the fluid is air.

6. The valve of claim 4 where said piston is ordinarily maintained in said first position by fluid flow through said inlet.

7. The valve of claim 4 further including means to vent pressurized fluid from said pressurized fluid member once the piston has moved to the second position.

8. The valve of claim 4 where said piston defines upper and lower portions separated by a seal, where said piston is returned from the second position to the first position when pressure acting on the upper portion of said piston is less than about 0.7 times the pressure acting on the lower portion.

9. A remotely actuated shutoff valve for use with a marine acoustic generator airgun, which airgun has a reciprocating shuttle that serves to hold a charge of pressurized fluid and then release the charge of pressurized fluid into the surrounding water to create a pressure pulse, comprising:

a housing defining an internal bore, an inlet and an outlet, where a fluid introduced into said inlet selectively communicates with said outlet depending on the position of a piston in said bore;

a piston slidably disposed between a first and a second position in said bore, where in said first position fluid communicates between said inlet and said outlet and wherein said second position gas communication between said inlet and outlet is interrupted;

said piston defining first and second surface areas where said first surface area is greater than said second surface area, where each of said first and second surfaces may be acted upon by the pressurized fluid and where pressurized fluid acting on said first surface area moves said piston from said first to said second position; and means for selectively introducing pressurized fluid to said first surface area of said piston.

10. The valve of claim 9 where the area of the second surface is approximately 0.7 times the area of said first surface.

11. In a marine seismic surveying system having an airgun towed behind a survey vessel and a pneumatic line supplying pressurized air for the airgun, wherein the airgun has a reciprocating shuttle that serves to hold a charge of pressurized air and then release the charge of pressurized air into the surrounding water to create a pressure pulse, the improvement comprising:

a shutoff valve coupled between the pneumatic line and the airgun, the valve being actuated between opened and closed conditions to selectively permit pressurized air to flow through the valve to the airgun and to shut off flow of pressurized air to the airgun;

said shutoff valve comprising a housing having an internal chamber, an inlet port to be coupled to the pneumatic line, and an outlet port to be coupled to the airgun;

a piston movable within the housing chamber between a first position defining an open valve condition wherein pressurized air flows from the inlet port to the outlet port and a second position defining a closed valve condition wherein pressurized air flow to the outlet port is shut off; and a selectively activated flow diverter coupled between the inlet port and a distal portion of the housing chamber, said flow diverter, when activated, actuating the piston from the first position to the second position by diverting a portion of the pressurized air entering the inlet port and directing it to the distal portion of the housing chamber where it acts to move the piston.

12. A shutoff valve for use with a marine acoustic generator airgun, which airgun has a reciprocating shuttle that serves to hold a charge of pressurized air provided to it through a pneumatic line and then release the charge of pressurized air into the surrounding water to create a pressure pulse upon receipt of an electrical pulse of a first polarity over a pair of electrical conductors, said shutoff valve comprising:

a housing having an internal chamber, an inlet port to be coupled to the pneumatic line, and an outlet port to be coupled to the airgun;

a piston movable within the housing chamber between a first position defining an open valve condition wherein pressurized air flows from the inlet port to the outlet port and a second position defining a closed valve condition wherein pressurized air flow to the outlet port is shut off;

a passage within said housing extending between the inlet port and a distal portion of the internal chamber, said passage directing a flow of pressurized air from the inlet port to act upon the piston to move the piston from the first position to the second position; and a solenoid-activated poppet disposed along said passage and biased to a position that normally prevents pressurized air from being directed through the passage to act upon the piston, said solenoid-activated poppet being coupled to the pair of electrical conductors and being activated upon receipt of an electrical pulse of a second polarity to allow pressurized air to flow through the passage to act upon the piston.

* * * * *